United States Patent
Nakadai et al.

(10) Patent No.: US 7,309,018 B2
(45) Date of Patent: Dec. 18, 2007

(54) SEMICONDUCTOR INTEGRATED CIRCUIT DEVICE AND NONCONTACT IC CARD

(75) Inventors: Yutaka Nakadai, Yachiyo (JP); Yasuyoshi Nakajima, Kokubunji (JP); Norihisa Yamamoto, Kodaira (JP); Toshiaki Shibata, Kodaira (JP)

(73) Assignees: Renesas Technology Corp., Tokyo (JP); Hitachi Hybrid Network Co., Ltd., Yokohama-shi (JP)

( * ) Notice: Subject to any disclaimer, the term of this patent is extended or adjusted under 35 U.S.C. 154(b) by 216 days.

(21) Appl. No.: 11/183,888

(22) Filed: Jul. 19, 2005

(65) Prior Publication Data

US 2006/0038024 A1    Feb. 23, 2006

(30) Foreign Application Priority Data

Aug. 18, 2004    (JP)    ............................. 2004-238151

(51) Int. Cl.
  *G06K 19/06*    (2006.01)
(52) U.S. Cl. ....................................... 235/492; 235/449
(58) Field of Classification Search ................ 235/492, 235/375, 380, 382, 493, 486, 487, 449
  See application file for complete search history.

(56) References Cited

U.S. PATENT DOCUMENTS

| | | | | |
|---|---|---|---|---|
| 4,638,358 A | * | 1/1987 | Nozoe et al. ................ | 348/464 |
| 5,949,796 A | * | 9/1999 | Kumar ........................ | 370/529 |
| 6,975,665 B1 | * | 12/2005 | McCorkle .................... | 375/130 |
| 7,046,694 B2 | * | 5/2006 | Kumar ........................ | 370/487 |
| 2005/0056704 A1 | * | 3/2005 | Kim ............................ | 235/492 |
| 2005/0265428 A1 | * | 12/2005 | McCorkle .................... | 375/130 |

FOREIGN PATENT DOCUMENTS

| | | |
|---|---|---|
| JP | 2003-044801 | 2/2003 |
| JP | 2003-233787 | 8/2003 |

* cited by examiner

Primary Examiner—Thien Minh Le
(74) Attorney, Agent, or Firm—Miles & Stockbridge P.C.

(57)    ABSTRACT

A semiconductor integrated circuit includes a demodulating circuit, a plurality of sampling circuits each capable of sampling output signals of the demodulating circuit, a plurality of detection circuits capable of detecting headers of output signals of the sampling circuits, a plurality of processing circuits capable of performing a predetermined data process based on the detection results of the detection circuits, and a circuit capable of determining a match to a preset communication method from results of the header detection by the detection circuits. By performing processes adapted to different communication methods in parallel, time required to establish a connection and enable information to be transmitted/received is reduced.

7 Claims, 9 Drawing Sheets

SEMICONDUCTOR INTEGRATED CIRCUIT DEVICE AND NONCONTACT IC CARD

CROSS-REFERENCE TO RELATED APPLICATION

The present application claims priority from Japanese patent application No. 2004-238151 filed on Aug. 18, 2004, the content of which is hereby incorporated by reference into this application.

BACKGROUND OF THE INVENTION

The present invention relates to an IC card technique and, more particularly, to a noncontact IC card adaptable to a plurality of different communication methods and a semiconductor integrated circuit device mounted on the noncontact IC.

Cards having a conventional noncontact interface are adapted to a number of methods such as ISO14443-A and ISO14443-B set by the ISO standard and an IC card method for high-speed processing (called a "high-speed type") set by Japan IC card system application council (JICSAP). In recent years, a contact/noncontact combination card is being spread. Also in the non-contact type, a combination card adapted to a plurality of different communication methods is in demand.

As an example of a noncontact IC card communication establishing method and system of searching for a communication method while switching it and establishing a connection between a noncontact IC card having a function of switching a plurality of communication interfaces and a reader-writer, a technique disclosed in Japanese Unexamined Patent Publication No. 2003-233787 is known. In the technique, at the time of establishing a communication method between a noncontact IC card and a reader-writer, when a modulation signal from the outside is received, based on repeatability of the modulation signal, the signal is distinguished from noise. By obtaining a match while sequentially switching a demodulating method at the ante stage and a coding method at the post stage, a communication method adapted to the signal from the noncontact IC card or the reader-writer is detected and a communication is established between the noncontact IC card and the reader-writer.

Japanese Unexamined Patent Publication No. 2003-044801 discloses a portable information processing device having a plurality of information transmitting means for performing communication with the outside, identifying means of detecting information transmitting means via which information is transmitted, and control means for obtaining default application information adapted to the information transmitting means detected by the identifying means with reference to a default application management table in which correspondence between the information transmitting means and the default application is set, and selecting the default application.

SUMMARY OF THE INVENTION

The inventors herein have found that the technique disclosed in Japanese Unexamined Patent Publication No. 2003-233787 employs a method of searching for the communication method while switching it and establishing a connection, so that it takes time to establish a connection. For example, a demodulation circuit is selected by a demodulation selector disposed on the input side of the plurality of demodulating circuits, and whether demodulation can be made or not is determined each time the demodulating circuit is selected. When it is determined that demodulation cannot be made, the next demodulating circuit is selected and whether demodulation can be made by the selected demodulating circuit or not is determined. When it is determined that demodulation can be performed, a plurality of decoding circuits are sequentially selected by a coding selector disposed on the output side of the plurality of demodulating circuits. Each time the decoding circuit is selected, whether input data can be decoded or not is determined. Consequently, it takes time to establish a connection and enable information to be actually transmitted/received between a noncontact IC card and a reader-writer.

In Japanese Unexamined Patent Publication No. 2003-044801, an OS executing unit of a CPU includes identifying means having the function of identifying transmitting means (contact/noncontact type and communication protocol) before analysis of a command transmitted from an external terminal (reader-writer) and notifying of the result. The communication protocol used is determined by a communication module in a lower layer of the OS and notified to the OS. A concrete method of determining a communication protocol is not described.

An object of the invention is to provide a technique for shortening time required to establish a connection and enable information to be actually transmitted/received in a noncontact IC card adaptable to a plurality of communication methods.

The above and other objects and novel features of the invention will become apparent from the description of the specification and the appended drawings.

An outline of representative ones of inventions disclosed in the specification will be briefly described as follows.

A semiconductor integrated circuit device includes: a demodulating circuit capable of demodulating an input signal; a plurality of sampling circuits which are commonly connected to an output of the demodulating circuit and each capable of sampling output signals of the demodulating circuit synchronously with a predetermined clock signal; a plurality of detection circuits arranged in correspondence with the sampling circuits and capable of detecting headers of output signals of the corresponding sampling circuits; a plurality of processing circuits disposed in correspondence with the plurality of detection circuits and capable of performing a predetermined data process on the basis of detection results of the corresponding detection circuits; and a communication method determining circuit capable of determining a match to a preset communication method from results of the header detection by the plurality of detection circuits.

With the configuration, an output signal of the single demodulating circuit is input the plurality of sampling circuits, output signals of the plurality of sampling circuits are input to the plurality of corresponding detection circuits, and detection results of the plurality of detection circuits are transmitted to the plurality of corresponding processing circuits. Consequently, processes corresponding to a plurality of communication methods different from each other are performed in parallel. Thus, time required to establish a connection and enable information to be actually transmitted/received is shortened as compared with a conventional method of sequentially selecting circuits by using a selector.

In the configuration, the plurality of sampling circuits can operate in parallel with each other, the plurality of detection circuits can operate in parallel with each other, and the plurality of processing circuits can operate exclusively on the basis of a result of determination of the communication method determining circuit.

As other concrete modes, the device can be constructed as follows.

A semiconductor integrated circuit device may include: a demodulating circuit capable of demodulating an input signal; a first sampling circuit capable of sampling output signals of the demodulating circuit synchronously with a predetermined clock signal; a second sampling circuit capable of sampling output signals of the demodulating circuit, which are the same as those input to the first sampling circuit, synchronously with a predetermined clock signal in parallel with the sampling operation of the first sampling circuit; a first detection circuit capable of detecting a header in an output signal of the first sampling circuit; a second detection circuit operating in parallel with the first detection circuit and capable of detecting a header in an output signal of the second sampling circuit; a first processing circuit receiving a detection result of the first detection circuit and capable of performing a predetermined data process; a second processing circuit receiving a detection result of the second detection circuit and capable of performing a predetermined data process; and a communication method determining circuit capable of determining a match to a preset communication method from detection results of the first and second detection circuits. The first and second processing circuits operate exclusively on the basis of a determination result of the communication method determining circuit. In this case, the first detection circuit detects a preamble in an output signal of the first sampling circuit, and the second detection circuit detects an SOF (Start Of Frame) in an output signal of the second sampling circuit.

A semiconductor integrated circuit device may include: a demodulating circuit capable of demodulating an input signal; a first sampling circuit capable of sampling output signals of the demodulating circuit synchronously with a predetermined clock signal; a second sampling circuit capable of sampling output signals of the demodulating circuit, which are the same as those input to the first sampling circuit, synchronously with a predetermined clock signal in parallel with the sampling operation of the first sampling circuit; a first detection circuit capable of detecting a header in an output signal of the first sampling circuit; a second detection circuit capable of detecting a header in an output signal of the second sampling circuit, which is the same as that input to the first sampling circuit, in parallel with the sampling operation of the first detection circuit; a first processing circuit receiving a detection result of the first detection circuit and capable of performing a predetermined data process; a second processing circuit receiving a detection result of the second detection circuit and capable of performing a predetermined data process; and a communication method determining circuit capable of determining a match to a preset communication method from output signals of the first and second sampling circuits. The first and second processing circuits operate exclusively on the basis of a determination result of the communication method determining circuit. The communication method determining circuit can determine a match to either a first communication method conformed with ISO14443-A or a second communication method conformed with ISO14443-B.

A semiconductor integrated circuit device may include: a demodulating circuit capable of demodulating an input signal; a first sampling circuit capable of sampling output signals of the demodulating circuit synchronously with a predetermined clock signal; a second sampling circuit capable of sampling output signals of the demodulating circuit, which are the same as those input to the first sampling circuit, synchronously with a predetermined clock signal in parallel with the sampling operation of the first sampling circuit; a first detection circuit capable of detecting a header in an output signal of the first sampling circuit; a second detection circuit operating in parallel with the first detection circuit and capable of detecting a header in an output signal of the first sampling circuit; a third detection circuit operating in parallel with the first and second detection circuits and capable of detecting a header in an output signal of the second sampling circuit; a fourth detection circuit operating in parallel with the first, second, and third detection circuits and capable of detecting a header in an output signal of the second sampling circuit; a first processing circuit receiving a detection result of the first detection circuit and capable of performing a predetermined data process; a second processing circuit receiving a detection result of the second detection circuit and capable of performing a predetermined data process; a third processing circuit receiving a detection result of the third detection circuit and capable of performing a predetermined data process; a fourth processing circuit receiving a detection result of the fourth detection circuit and capable of performing a predetermined data process; and a communication method determining circuit capable of determining a match to a preset communication method from detection results of the first, second, third, and fourth detection circuits. The first, second, third, and fourth processing circuits operate exclusively on the basis of a determination result of the communication method determining circuit.

By mounting a semiconductor integrated circuit with any of the above-described configurations, a noncontact IC card adaptable to a plurality of reader-writers of different communication methods can be constructed.

An effect obtained by the representative ones of the inventions disclosed in the specification is briefly described as follows.

In short, time required to establish a connection in a noncontact IC card adaptable to a plurality of communication methods can be shortened.

DETAILED DESCRIPTION OF PREFERRED EMBODIMENTS

Figure 6:
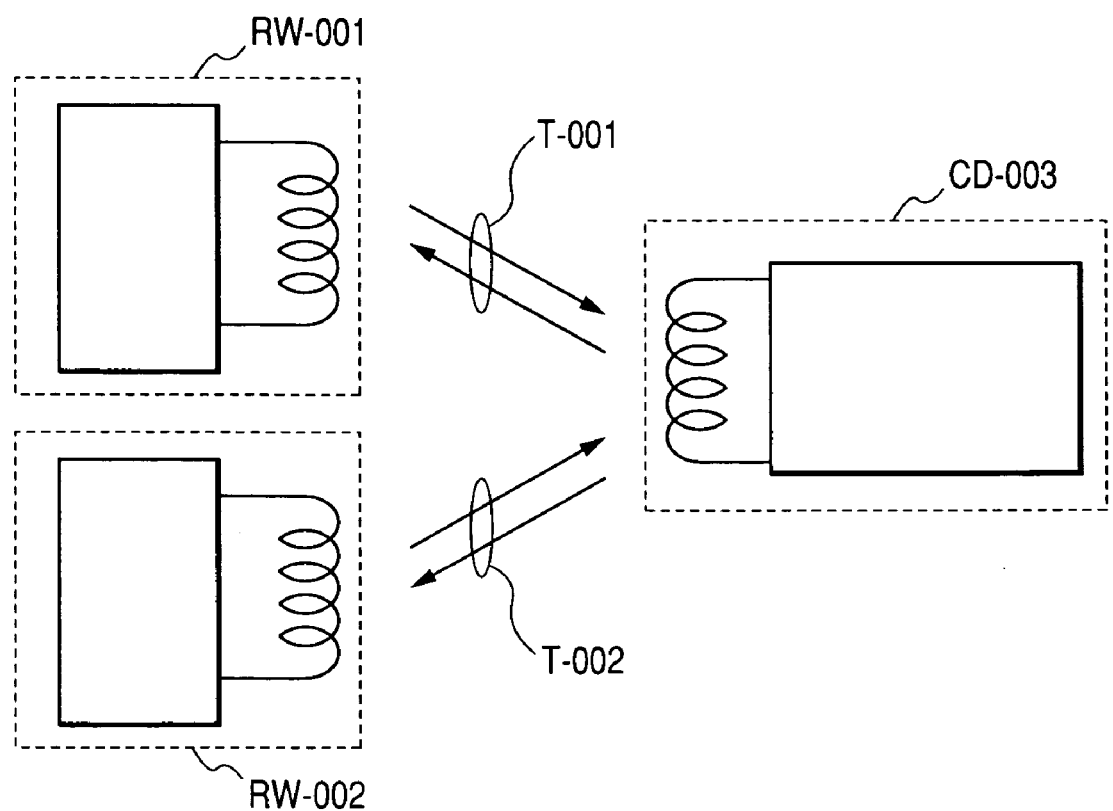
FIG. 6 is a diagram showing an example of the configuration of a noncontact IC card system including the noncontact IC card.

FIG. 6 shows a noncontact IC card system including a noncontact IC card of the invention. The noncontact IC card system includes reader-writers RW-001 and RW-002 of different communication methods, and a noncontact IC card CD-003 enabling information to be transmitted/received between the reader-writers RW-001 and RW-002. The noncontact IC card CD-003 is adapted to both of a communication method T-001 of the reader-writer RW-001 and a communication method T-002 of the reader/writer RW-002. Although not limited, the communication method T-001 is ISO14443-B, and the communication method T-002 is the high-speed type. The high-speed type has a coding method 1 (Manchester coding) and a header type 1 (preamble) of a packet format. The ISO14443-B type has a coding method 2 (NRZ) and a header type 2 (SOF) of a packet format.

Figure 7:
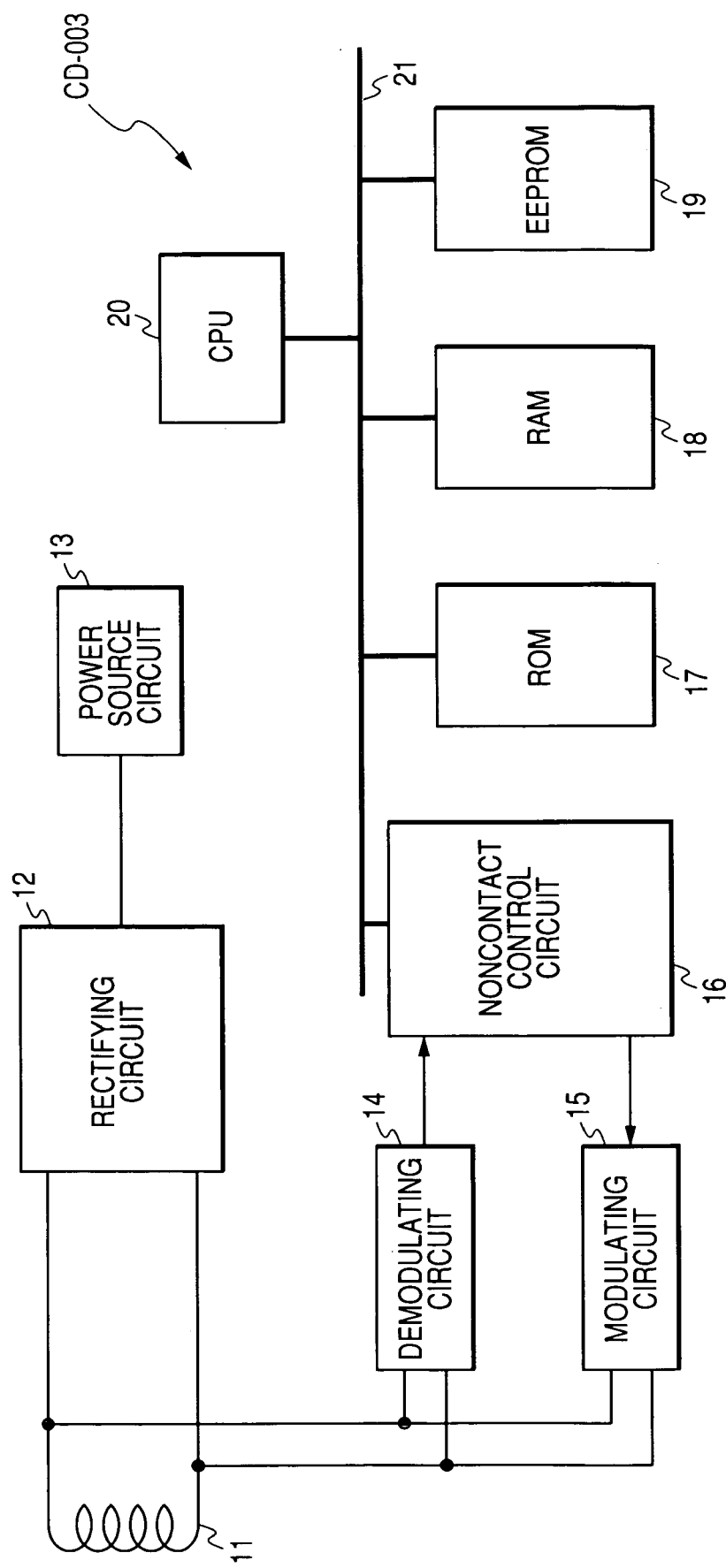
FIG. 7 is a block diagram showing the configuration of the semiconductor integrated circuit device.

FIG. 7 shows a general configuration of the noncontact IC card CD-003.

The noncontact IC card CD-003 includes, although not limited, an antenna coil 11, a rectifying circuit 12, a power source circuit 13, a CPU 20, a demodulating circuit 14, a modulating circuit 15, a noncontact control circuit 16, a ROM (Read Only Memory) 17, a RAM (Random Access Memory) 18, an EEPROM (Electrically Erasable Programmable Read Only Memory) 19, and a CPU (Central Processing Unit). The components except for the antenna coil 11 are formed on a single semiconductor substrate such as a single-crystal silicon substrate or the like by a known semiconductor integrated circuit manufacturing technique.

The antenna coil 11 enables power supply from the reader-writer RW-001 or RW-002 side and transmission/reception of various information by electromagnetic induction with the reader-writer RW-001 or RW-002. The rectifying circuit 12 rectifies the induced current obtained by the antenna coil 11. The rectified output is supplied to the power supply circuit 13. On the basis of an output of the rectifying circuit 12, the power supply circuit 13 generates a power source voltage for operating an internal circuit in the noncontact IC card CD-003. The demodulating circuit 14 demodulates a modulation signal transmitted from the reader-writer RW-001 or RW-002 via the antenna coil 11, thereby outputting a binary signal. The binary signal output from the demodulating circuit 14 is transmitted to the noncontact control circuit 16 at the post stage. The modulating circuit 15 modulates a predetermined carrier wave on the basis of a signal transmitted from the noncontact control circuit 16. An output signal of the modulating circuit 15 is transmitted to the reader-writer RW-001 or RW-002 via the antenna coil 11. The noncontact control circuit 16 executes various controls for transmitting/receiving information in a state where it is not in contact with the reader-writer RW-001 or RW-002 in accordance with a predetermined communication protocol. In the ROM 17, an OS (Operating System) as a basic program executed by the CPU 20 is stored. The RAM 18 is used as a temporary memory area of data, a work area of a computing process in the CPU 20, or the like. In the EEPROM 19, an application program to be executed by the CPU 20 is stored. The noncontact control circuit 16, ROM 17, RAM 18, EEPROM 19, and CPU 20 are coupled to each other so as to be able to transmit/receive signals to/from each other via a bus 21.

Figure 1:
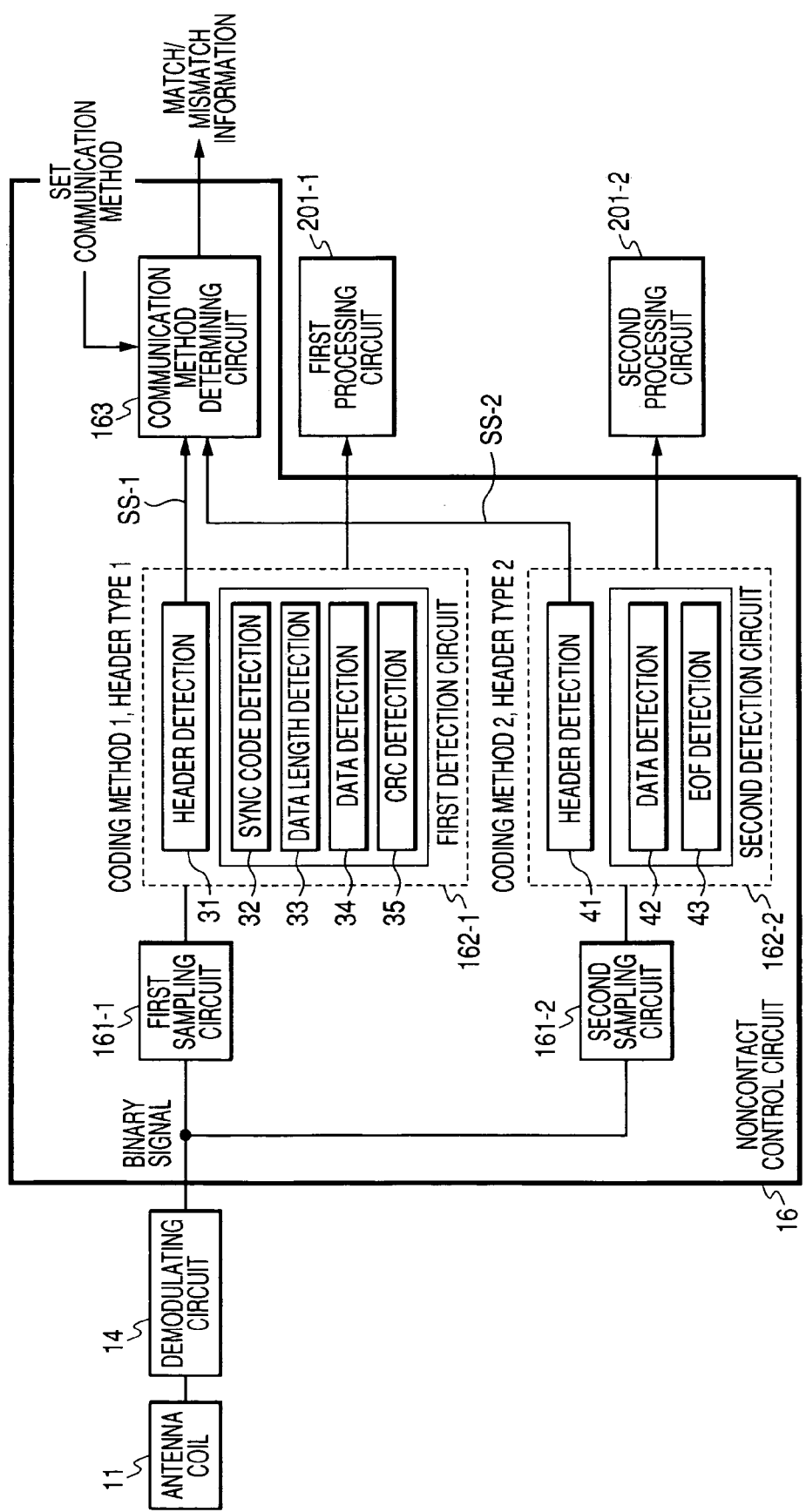
FIG. 1 is a block diagram showing the configuration of a main part of a semiconductor integrated circuit device to be mounted on a noncontact IC card of the invention.

FIG. 1 shows an example of the configuration of the noncontact control circuit 16.

The noncontact control circuit 16 includes a first sampling circuit 161-1, a second sampling circuit 161-2, a first detection circuit 162-1, a second detection circuit 162-2, and a communication method determining circuit 163. The first sampling circuit 161-1 samples output signals of the demodulating circuit 14 synchronously with a predetermined clock signal. An output signal of the first sampling circuit 161-1 is transmitted to the first detection circuit 162-1 disposed in correspondence with the first sampling circuit 161-1. The second sampling circuit 161-2 samples output signals of the demodulating circuit 14 synchronously with a predetermined clock signal. An output signal of the second sampling circuit 161-2 is transmitted to the second detection circuit 162-2 disposed in correspondence with the second sampling circuit 161-2. The communication method determining circuit 163 determines a matched preset communication method from the result of header detection of the first detection circuit 162-1 and the header detection result of the second detection circuit 162-2. Since the communication method T-01 is set as ISO14443-B and the communication method T-002 is set as high-speed type (refer to FIG. 6) in the embodiment, the communication method determining circuit 163 determines the ISO14443-B type or the high-speed type as the matched communication method.

As described above, the high-speed type has the coding method 1 (Manchester coding) and the header type 1 (preamble) of the packet format, and the ISO14443-B type has the coding method 2 (NRZ) and the header type 2 (SOF) of the packet format. Consequently, preamble detection is performed in header detection 31 in the first detection circuit 162-1, and SOF detection is performed in the header detection of the second detection circuit 162-2.

Figure 8:
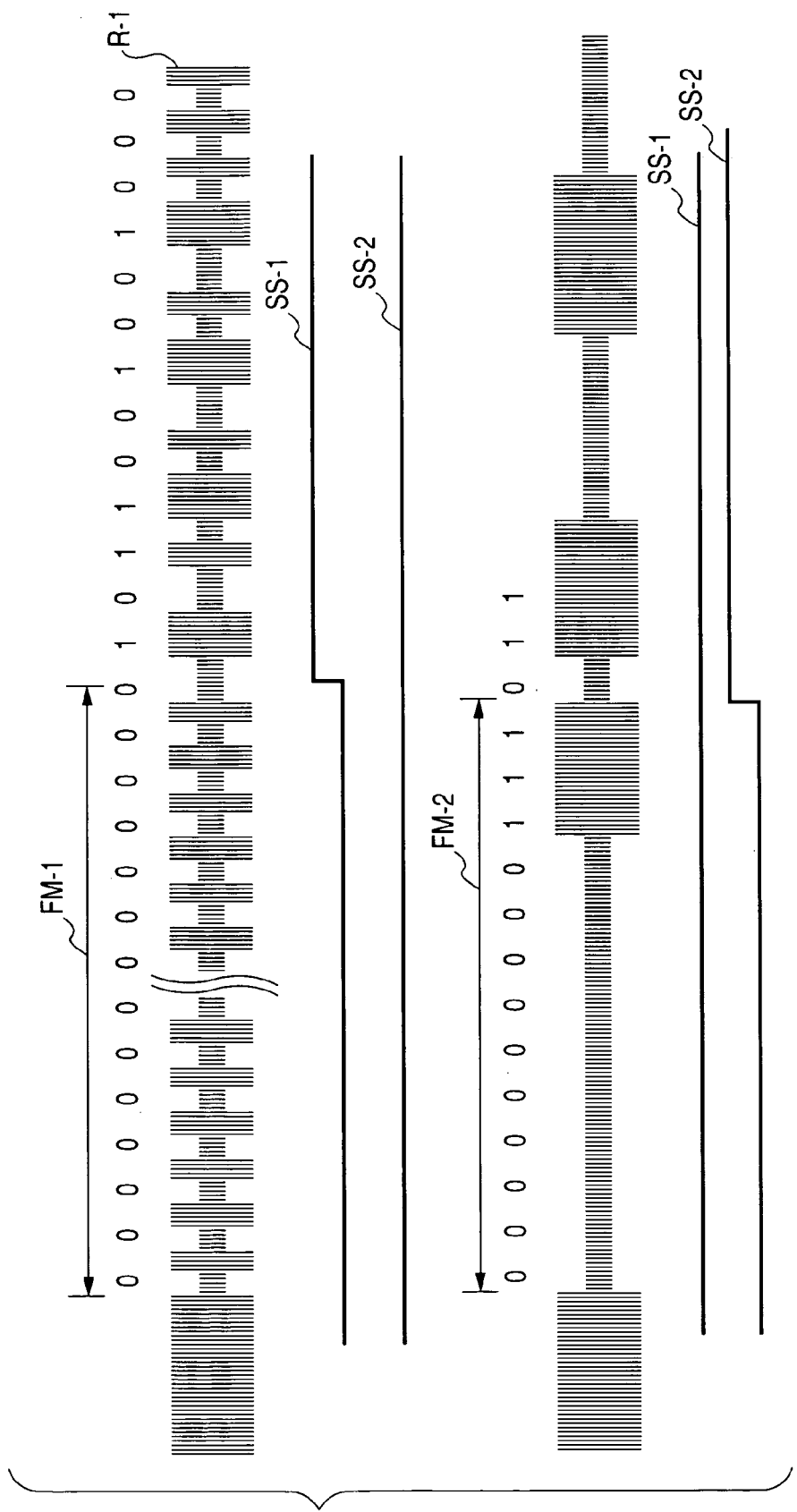
FIG. 8 is a diagram showing header detection performed in the semiconductor integrated circuit device.

For example, as shown in FIG. 8, a reader signal R-1 of the high-speed type has a preamble (FM-1) as the high-speed type header. When the preamble (FM-1) is detected by the header detection 31 of the first detection circuit 162-1, a header detection result SS-1 of the first detection circuit 162-1 is asserted to the high level, thereby transmitting a signal indicating that the preamble (FM-1) is detected to the communication method determining circuit 163. At this time, a low-level state of a detection result SS-2 of header detection 41 in the second detection circuit 162-2 is maintained.

On the other hand, a reader signal R-2 of the ISO14443-B type has SOF (FM-2) as the header of the ISO14443-B type. When the SOF (FM-2) is detected in the header detection 41 in the second detection circuit 162-2, the detection result SS-2 of the header detection 41 in the second detection circuit 162-2 is asserted to the high level, thereby transmitting a signal indicating that the SOF (FM-2) is detected to the communication method determining circuit 163. At this time, the detection result SS-1 of the header detection 31 in the first detection circuit 162-1 is maintained in the low level state.

In the case where the header detection result SS-1 is asserted to the high level, the communication method determining circuit 163 supplies a signal indicative of a match to the "high-speed type" as match/mismatch information to the CPU 20. In the case where the header detection result SS-2 is asserted to the high level, a signal indicative of a match to the "ISO14443-B type" is supplied as match/mismatch information to the CPU 20.

In the first detection circuit 162-1, other than the header detection 31, SYNC (sync) code detection 32, data length detection 33, data detection 34, and CRC (error correcting code) detection 35 are performed, and a detection result is transmitted to a first processing circuit 201-1. The first processing circuit 201-1 is, although not limited, processing means which is realized by execution of a predetermined program in the CPU 20. In the second detection circuit 162-1, other than the header detection 41, data detection 42 and EOF (End Of Frame) detection 43 are performed. The detection result is transmitted to a second processing circuit 201-2. The second processing circuit 202-2 is, although not limited, processing means which is realized by execution of a predetermined program in the CPU 20.

Figure 2:
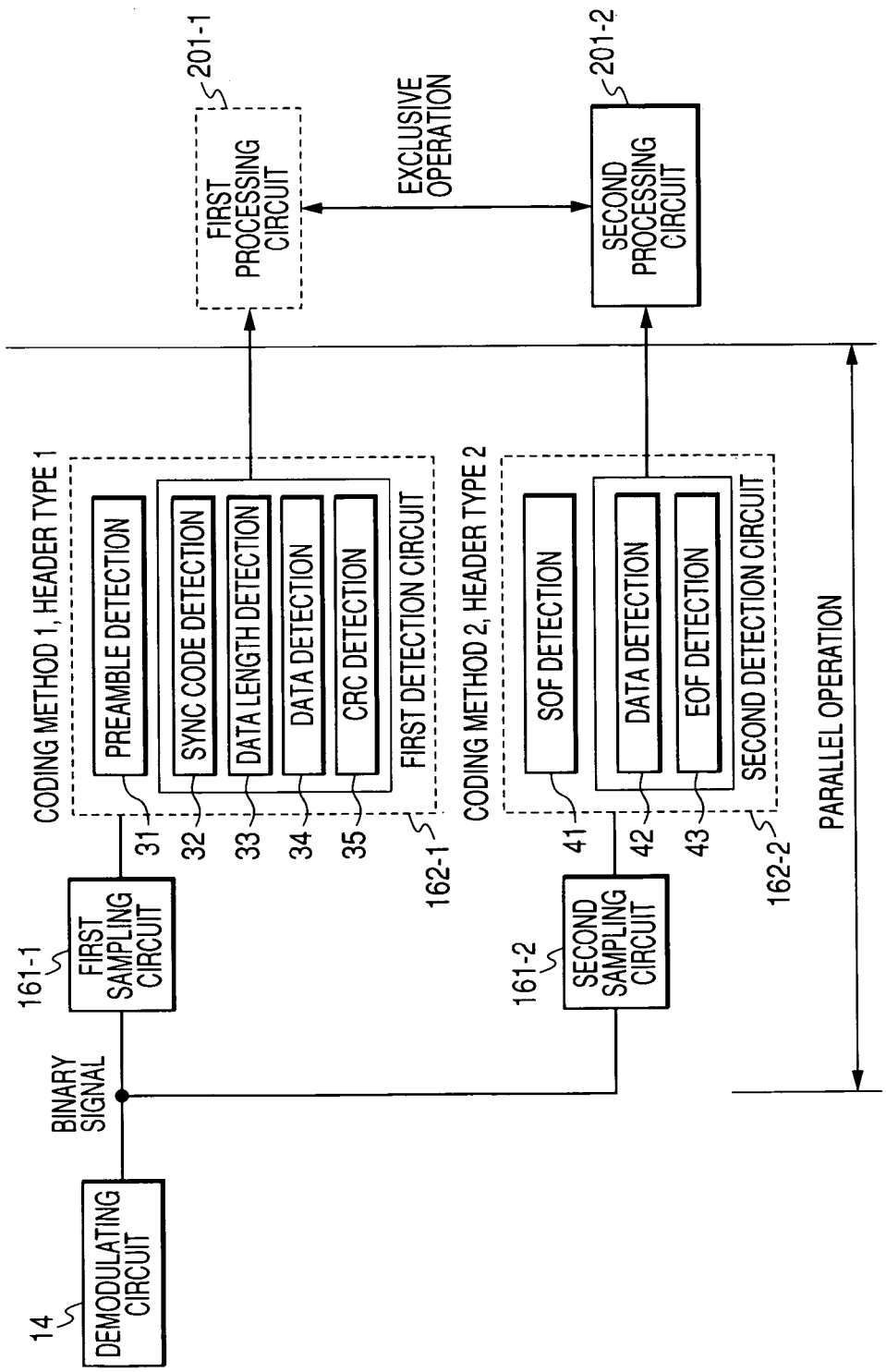
FIG. 2 is a diagram illustrating operation of the semiconductor integrated circuit device.

As shown in FIG. 2, the first and second sampling circuits 161-1 and 161-2 operate in parallel, and the first and second detection circuits 162-1 and 162-2 operate in parallel. On the other hand, as shown in FIG. 2, a process in the first processing circuit 201-1 and a process in the second processing circuit 201-2 are performed exclusively in accordance with a result of determination in the communication method determining circuit 163. Specifically, in the case where the header detection result SS-1 is asserted to the high level, a signal indicative of a match to the "high-speed type" is supplied as the match/mismatch information from the communication method determining circuit 163 to the CPU 20. By control of the CPU 20, execution of the process in the second processing circuit 201-2 is inhibited since it is useless to perform a process corresponding to the "ISO14443-B type" on data input in the "high-speed type" communication method by the second processing circuit 201-2. Similarly, in the case where the header detection result SS-2 is asserted to the high level, a signal indicative of a match to the "ISO14443-B type" is supplied as the match/mismatch information from the communication method determining circuit 163 to the CPU 20. By control of the CPU 20, execution of the process in the first processing circuit 201-1 is inhibited since it is useless to perform a process corresponding to the "high-speed type" on data input in the "ISO14443-B type" communication method by the first processing circuit 201-1.

The embodiment can obtain the following effects.
(1) The semiconductor integrated circuit device of the invention includes: the single demodulating circuit 14 capable of demodulating an input signal; the first and second sampling circuits 161-1 and 161-2 each capable of sampling output signals of the demodulating circuit synchronously with a predetermined clock signal; the first and second detection circuits 162-1 and 162-2 capable of detecting headers of output signals of the corresponding sampling circuits; the first and second processing circuits 201-1 and 201-2 capable of performing a predetermined data process on the basis of detection results of the corresponding detection circuits; and the communication method determining circuit 163 capable of determining a match to a preset communication method from results of the header detection by the plurality of detection circuits. Since the first and second sampling circuits 161-1 and 161-2 capable of sampling signals operate in parallel and the first and second detection circuits 162-1 and 162-2 operate in parallel, time required to establish a connection and enable information to be actually transmitted/received is reduced more than the conventional method of determining a proper circuit by sequentially selecting circuits by a selector.
(2) By exclusively performing a process in the first processing circuit 201-1 and a process in the second processing circuit 201-2 in accordance with a result of determination in the communication method determining circuit 163, the process can be efficiently performed.

Other examples of the configuration will now be described.

Figure 3:
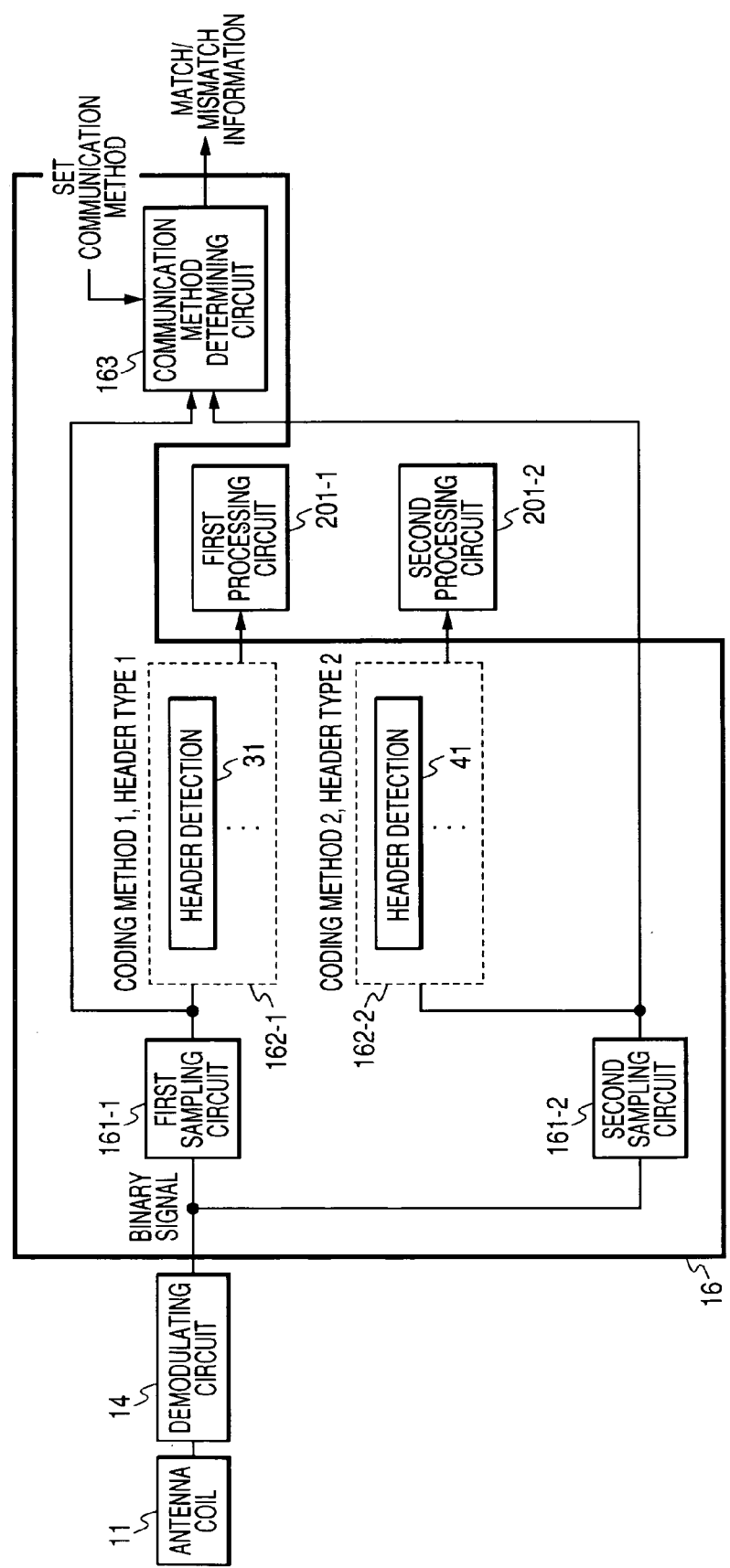
FIG. 3 is a block diagram showing another configuration of the main part of the semiconductor integrated circuit device.
Figure 9:
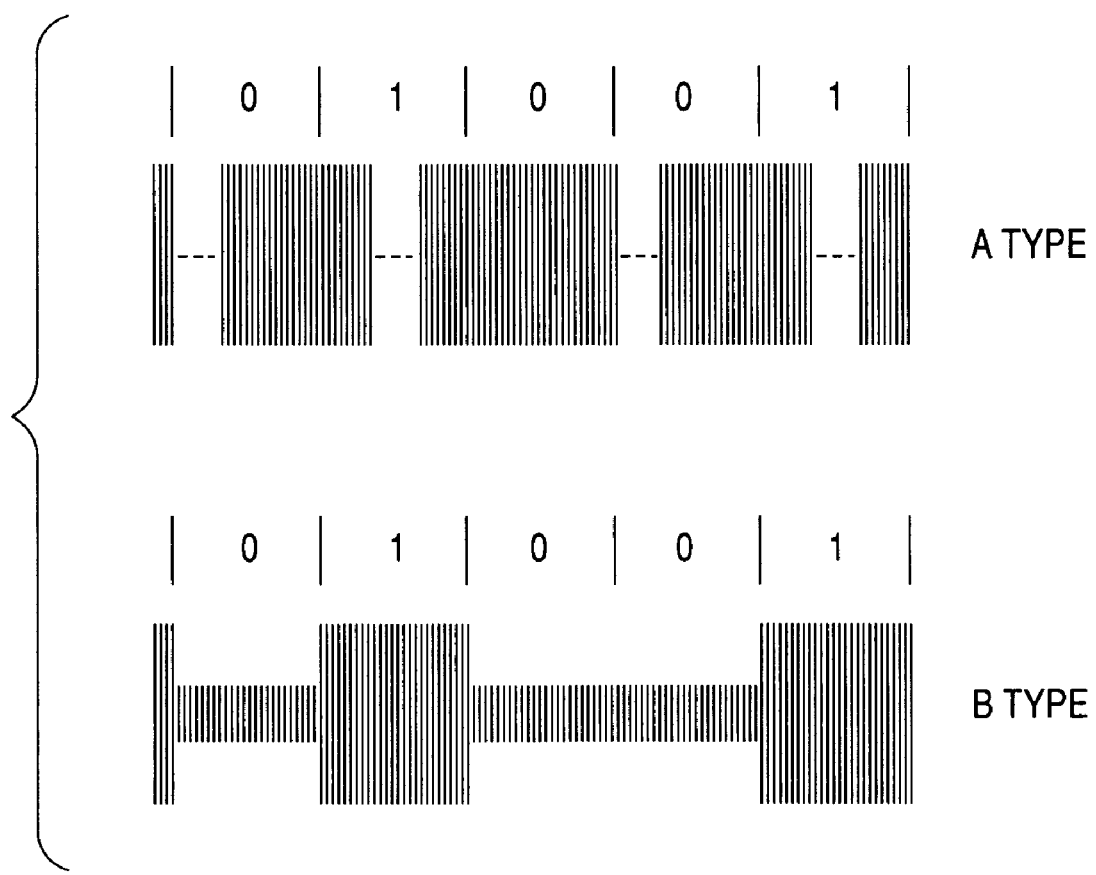
FIG. 9 is a diagram showing header detection performed in the semiconductor integrated circuit device.

The configuration shown in FIG. 3 is largely different from that shown in FIG. 1 with respect to the point that an output signal of the first sampling circuit 161-1 and an output signal of the second sampling circuit 161-2 are supplied to the communication method determining circuit 163 and, on the basis of the output signals of the first and second sampling circuits 161-1 and 161-2, a communication method is determined. For example, as shown in FIG. 9, in the ISO14443-A type, a method of performing 100% ASK modulation by short-interrupting an RF operation magnetic field is used. In the ISO14443-B type, a method of performing 10% ASK modulation is used. The difference can be determined on the basis of an output signal of the first sampling circuit 161-1 and an output signal of the second sampling circuit 161-2.

Figure 4:
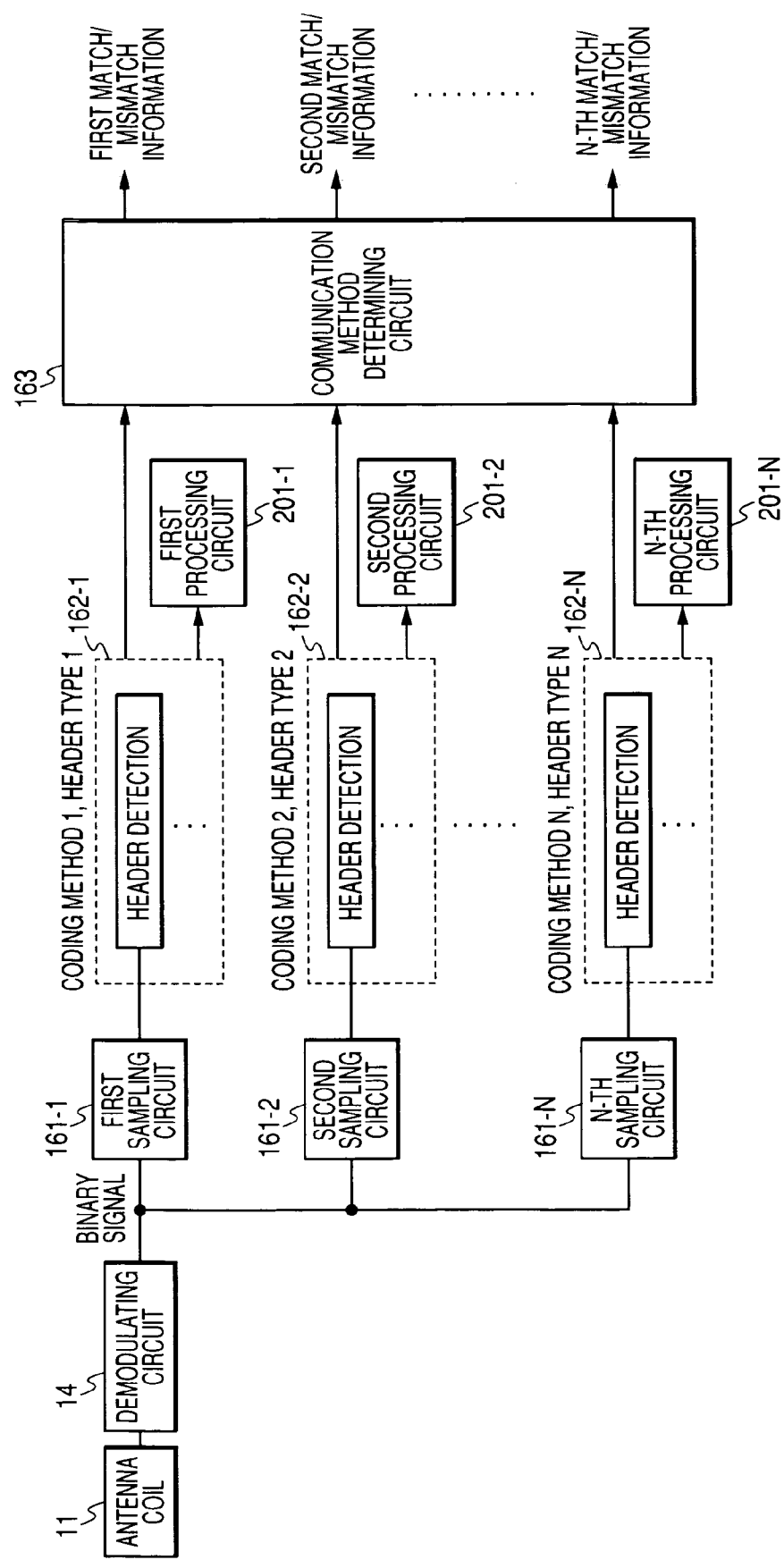
FIG. 4 is a block diagram showing another configuration of the main part of the semiconductor integrated circuit device.

The configuration shown in FIG. 4 is largely different from that shown in FIG. 1 with respect to the point that N (N=3, 4, 5, . . . ) pieces of sampling circuits 161-1 to 161-N are provided and, in correspondence with the sampling circuits 161-1 to 161-N, N pieces of detection circuits 162-1 to 162-N and N pieces of processing circuits 201-1 to 201-N are provided. With a configuration, a noncontact IC card adaptable to a larger number of communication methods different from each other can be formed.

Figure 5:
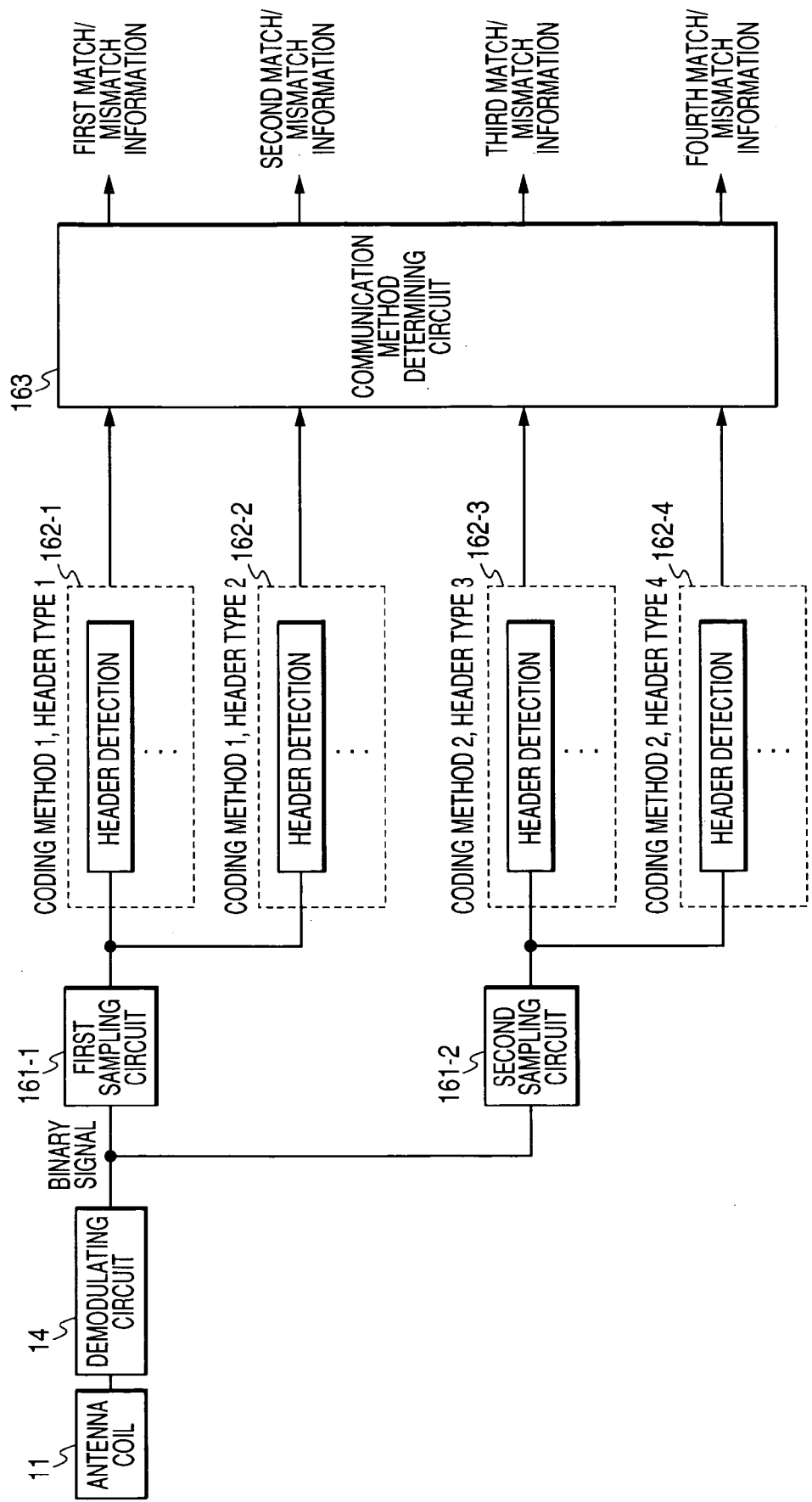
FIG. 5 is a block diagram showing another configuration of the main part of the semiconductor integrated circuit device.

The configuration shown in FIG. 5 is largely different from that shown in FIG. 1 with respect to the point that the first and second detection circuits 162-1 and 162-2 are disposed in correspondence with the first sampling circuit 161-1, and the third and fourth detection circuits 162-3 and 162-4 are provided in correspondence with the second sampling circuit 161-2. Although processing circuits are connected to the first, second, third, and fourth detection circuits 162-1, 162-2, 162-3, and 162-4 as shown in FIG. 1, the processing circuits are not shown in FIG. 5.

Although the invention achieved by the inventors herein has been concretely described above, obviously, the invention is not limited to the concrete examples but may be variously modified without departing from the gist.

In the above, the case where the invention achieved by the inventors herein is applied to a semiconductor integrated circuit to be mounted on an IC card in the field of utilization as the background has been described. However, the invention is not limited to the case.

The invention can be applied on condition that at least a single demodulating circuit capable of demodulating an input signal is provided.

What is claimed is:
1. A semiconductor integrated circuit device comprising:
a demodulating circuit capable of demodulating an input signal;
a plurality of sampling circuits which are commonly connected to an output of said demodulating circuit and each capable of sampling output signals of said demodulating circuit synchronously with a predetermined clock signal;
a plurality of detection circuits arranged in correspondence with said sampling circuits and capable of detecting headers of output signals of said corresponding sampling circuits;
a plurality of processing circuits disposed in correspondence with said plurality of detection circuits and capable of performing a predetermined data process on the basis of detection results of said corresponding detection circuits; and
a communication method determining circuit capable of determining a match to a preset communication method from results of the header detection by said plurality of detection circuits.

2. The semiconductor integrated circuit device according to claim 1, wherein said plurality of sampling circuits operate in parallel with each other, said plurality of detection circuits operate in parallel with each other, and said plurality of processing circuits operate exclusively on the basis of a result of determination of said communication method determining circuit.

3. A semiconductor integrated circuit device comprising:
a demodulating circuit capable of demodulating an input signal;
a first sampling circuit capable of sampling output signals of said demodulating circuit synchronously with a predetermined clock signal;
a second sampling circuit capable of sampling output signals of said demodulating circuit, which are the same as those input to said first sampling circuit, synchronously with a predetermined clock signal in parallel with the sampling operation of said first sampling circuit;
a first detection circuit capable of detecting a header in an output signal of said first sampling circuit;
a second detection circuit operating in parallel with said first detection circuit and capable of detecting a header in an output signal of said second sampling circuit;
a first processing circuit receiving a detection result of said first detection circuit and capable of performing a predetermined data process;
a second processing circuit receiving a detection result of said second detection circuit and capable of performing a predetermined data process; and
a communication method determining circuit capable of determining a match to a preset communication method from detection results of said first and second detection circuits,
wherein said first and second processing circuits operate exclusively on the basis of a determination result of said communication method determining circuit.

4. The semiconductor integrated circuit device according to claim 3, wherein said first detection circuit detects a preamble in an output signal of said first sampling circuit, and said second detection circuit detects a predetermined start frame in an output signal of said second sampling circuit.

5. A semiconductor integrated circuit device comprising:
a demodulating circuit capable of demodulating an input signal;
a first sampling circuit capable of sampling output signals of said demodulating circuit synchronously with a predetermined clock signal;
a second sampling circuit capable of sampling output signals of said demodulating circuit, which are the same as those input to said first sampling circuit, synchronously with a predetermined clock signal in parallel with the sampling operation of said first sampling circuit;
a first detection circuit capable of detecting a header in an output signal of said first sampling circuit;
a second detection circuit capable of detecting a header in an output signal of said second sampling circuit, which is the same as that input to said first sampling circuit, in parallel with the sampling operation of the first detection circuit;
a first processing circuit receiving a detection result of said first detection circuit and capable of performing a predetermined data process;
a second processing circuit receiving a detection result of said second detection circuit and capable of performing a predetermined data process; and
a communication method determining circuit capable of determining a match to a preset communication method from output signals of said first and second sampling circuits,
wherein said first and second processing circuits operate exclusively on the basis of a determination result of said communication method determining circuit.

6. The semiconductor integrated circuit device according to claim 5, wherein said communication method determining circuit determines a match to either a first communication method conformed with ISO14443-A or a second communication method conformed with ISO14443-B.

7. A semiconductor integrated circuit device comprising:
a demodulating circuit capable of demodulating an input signal;
a first sampling circuit capable of sampling output signals of said demodulating circuit synchronously with a predetermined clock signal;
a second sampling circuit capable of sampling output signals of said demodulating circuit, which are the same as those input to said first sampling circuit, synchronously with a predetermined clock signal in parallel with the sampling operation of said first sampling circuit;
a first detection circuit capable of detecting a header in an output signal of said first sampling circuit;
a second detection circuit operating in parallel with said first detection circuit and capable of detecting a header in an output signal of said first sampling circuit;
a third detection circuit operating in parallel with said first and second detection circuits and capable of detecting a header in an output signal of said second sampling circuit;
a fourth detection circuit operating in parallel with said first, second, and third detection circuits and capable of detecting a header in an output signal of said second sampling circuit;
a first processing circuit receiving a detection result of said first detection circuit and capable of performing a predetermined data process;
a second processing circuit receiving a detection result of said second detection circuit and capable of performing a predetermined data process;
a third processing circuit receiving a detection result of said third detection circuit and capable of performing a predetermined data process;
a fourth processing circuit receiving a detection result of said fourth detection circuit and capable of performing a predetermined data process; and
a communication method determining circuit capable of determining a match to a preset communication method from detection results of said first, second, third, and fourth detection circuits,
wherein said first, second, third, and fourth processing circuits operate exclusively on the basis of a determination result of said communication method determining circuit.

* * * * *